US010785030B2

(12) United States Patent
Wisgo

(10) Patent No.: US 10,785,030 B2
(45) Date of Patent: Sep. 22, 2020

(54) SYSTEM FOR DECRYPTING ENCRYPTED DATA BASED UPON ACQUIRED VISUAL REPRESENTATION OF ENCRYPTED DATA AND RELATED METHODS

(71) Applicant: CITRIX SYSTEMS, INC., Ft. Lauderdale, FL (US)

(72) Inventor: Jeffrey David Wisgo, Portland, OR (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 318 days.

(21) Appl. No.: 15/972,571

(22) Filed: May 7, 2018

(65) Prior Publication Data

US 2019/0342097 A1    Nov. 7, 2019

(51) Int. Cl.
*H04L 29/06* (2006.01)
*H04L 9/32* (2006.01)
*H04L 9/08* (2006.01)

(52) U.S. Cl.
CPC .......... *H04L 9/3226* (2013.01); *H04L 9/0866* (2013.01); *H04L 63/04* (2013.01); *H04L 63/10* (2013.01)

(58) Field of Classification Search
None
See application file for complete search history.

(56) References Cited

U.S. PATENT DOCUMENTS

| 2009/0006796 | A1* | 1/2009 | Chang | G06F 21/79 |
| | | | | 711/163 |
| 2013/0019096 | A1* | 1/2013 | Palzer | H04W 12/06 |
| | | | | 713/168 |
| 2013/0153666 | A1* | 6/2013 | Edwards | G06K 7/1095 |
| | | | | 235/462.25 |
| 2017/0039568 | A1* | 2/2017 | Tunnell | G06F 21/33 |

* cited by examiner

*Primary Examiner* — Andrew J Steinle
(74) *Attorney, Agent, or Firm* — Allen, Dyer, Doppelt + Gilchrist, P.A.

(57) ABSTRACT

A system for decrypting encrypted data may include a data storage server that may store encrypted data in a server memory, communicate a portion of the encrypted data to a first user device, and generate an access code for decrypting the portion of the encrypted data. The data storage device may also communicate the access code to a second user device. The first user device may display, on a first device display, a visual representation of the portion of the encrypted data. The second user device may acquire the visual representation of the portion of the encrypted data from the first device display, decrypt the portion of the encrypted data based upon the access code and the visual representation, and display the decrypted portion of the encrypted data on a second device display.

20 Claims, 7 Drawing Sheets

SYSTEM FOR DECRYPTING ENCRYPTED DATA BASED UPON ACQUIRED VISUAL REPRESENTATION OF ENCRYPTED DATA AND RELATED METHODS

TECHNICAL FIELD

The present invention is directed to the field of data encryption, and more particularly, to decryption of encrypted data and related methods.

BACKGROUND

Data security may be particularly desirable. For example, it may be desirable to keep what can be considered sensitive data or a high-security document from others, particularly malicious parties.

Data may be protected using one or more of several security techniques. For example, access to sensitive data may be password protected. Sensitive data may also be encrypted, in either or both of communication of the data and the storage of the data.

Increased security or maintaining sensitive data may be difficult in a multi-device system, particularly where sensitive data is communicated among different multiple devices. Devices, particularly, mobile devices, may be lost or stolen. Typically, with respect to a device that is lost or stolen, the device may easily be jailbroken, for example, and sensitive data can easily be accessed and read. Indeed, even a relatively strong encryption algorithm may be susceptible to brute-force attacks, particularly if given enough time.

SUMMARY

A system for decrypting encrypted data may include a first user device, a second user device, and a data storage server coupled to the first and second user devices and that includes a server processor and server memory. The server processor and the server memory may cooperate to store encrypted data in the server memory, communicate a portion of the encrypted data to the first user device, and generate an access code for decrypting the portion of the encrypted data. The server processor and the server memory may also cooperate to communicate the access code to the second user device. The first user device may include a first device processor and a first device display coupled thereto. The first processor may be configured to display on the first device display a visual representation of the portion of the encrypted data. The second user device may include a second device processor and second device display coupled to the second device processor. The second device processor may be configured to acquire the visual representation of the portion of the encrypted data from the first device display, decrypt the portion of the encrypted data based upon the access code and the visual representation, and display the decrypted portion of the encrypted data on the second device display.

The second user device may further include a camera cooperating with the second device processor to acquire the visual representation of the portion of the encrypted data from the first device display, for example. The first user device may have a unique device identifier associated therewith, and the second device processor may be configured to decrypt the portion of the encrypted data based upon the unique device identifier. The data storage server may be configured to communicate the unique device identifier to the second user device, for example.

The first device processor may be configured to communicate an encryption key to the second user device. The second device processor may be configured to decrypt the portion of the encrypted data based upon the encryption key, for example.

The first device processor may be configured to determine a relative proximity of the first user device to the second user device, and when within a threshold distance, display on the first device display the visual representation of the portion of the encrypted data, for example. The first user device may include a volatile memory coupled to the first device processor for storing the portion of the encrypted data, and the second user device may include a volatile memory coupled to the second device processor for storing the visual representation of the portion of the encrypted data.

The encrypted data may include a plurality of encrypted data files. The data storage server may be configured to communicate a portion of a given one of the plurality of encrypted data files to the first user device, for example.

The visual representation may include one of a quick response (QR) code and an arbitrary binary representation, for example. The server processor may be configured to communicate the portion of the encrypted data to the first user device based upon an authentication with the first user device. The server processor may be configured to communicate the access code to the second user device based upon an authentication with the second user device.

A method aspect is directed to a method of decrypting encrypted data in a system that includes a first user device, a second user device, and a data storage server coupled to the first and second user devices and configured to store encrypted data in a server memory. The method may include using the data storage server to communicate a portion of the encrypted data to the first user device to cause the first user device to display on a first device display a visual representation of the portion of the encrypted data and generate an access code for decrypting the portion of the encrypted data. The method may also include using the data storage server to communicate the access code to the second user device to cause the second user device, upon acquisition of the visual representation of the portion of the encrypted data from the first device display, decrypt the portion of the encrypted data based upon the access code and the visual representation, and display the decrypted portion of the encrypted data on a second device display.

A computer readable medium aspect is directed to a non-transitory computer readable medium for decrypting encrypted data in a system that includes a first user device, a second user device, and a data storage server coupled to the first and second user devices and configured to store encrypted data in a server memory. The non-transitory computer readable medium includes computer executable instructions for causing a processor of the data storage server to perform operations. The operations may include communicating a portion of the encrypted data to the first user device to cause the first device to display on a first device display a visual representation of the portion of the encrypted data and generating an access code for decrypting the portion of the encrypted data. The operations may also include communicating the access code to the second user device to cause the second user device, upon acquisition of the visual representation of the portion of the encrypted data from the first device display, decrypt the portion of the encrypted data based upon the access code and the visual representation, and display the decrypted portion of the encrypted data on a second device display.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notations are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
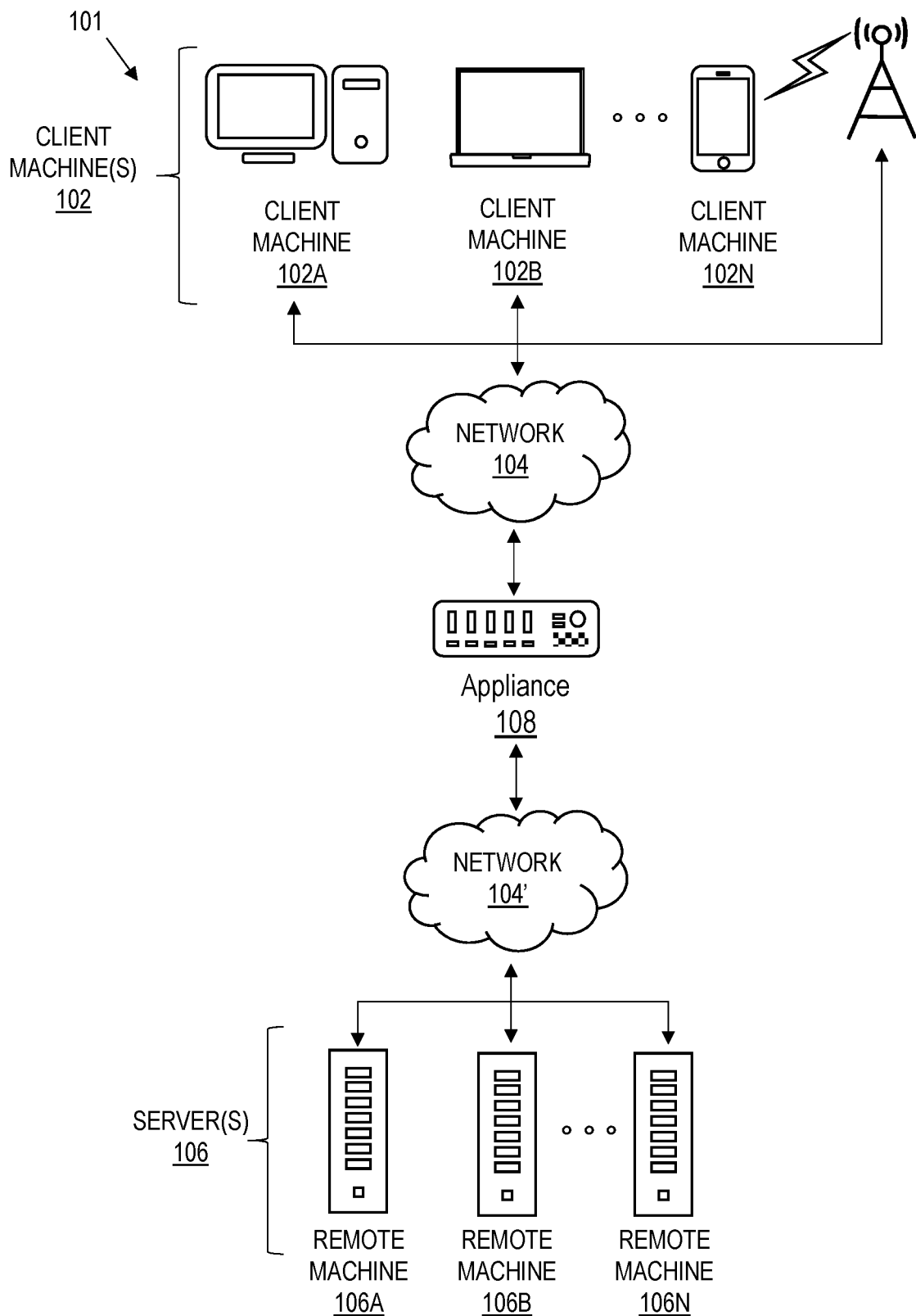
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NBC).

Figure 2:
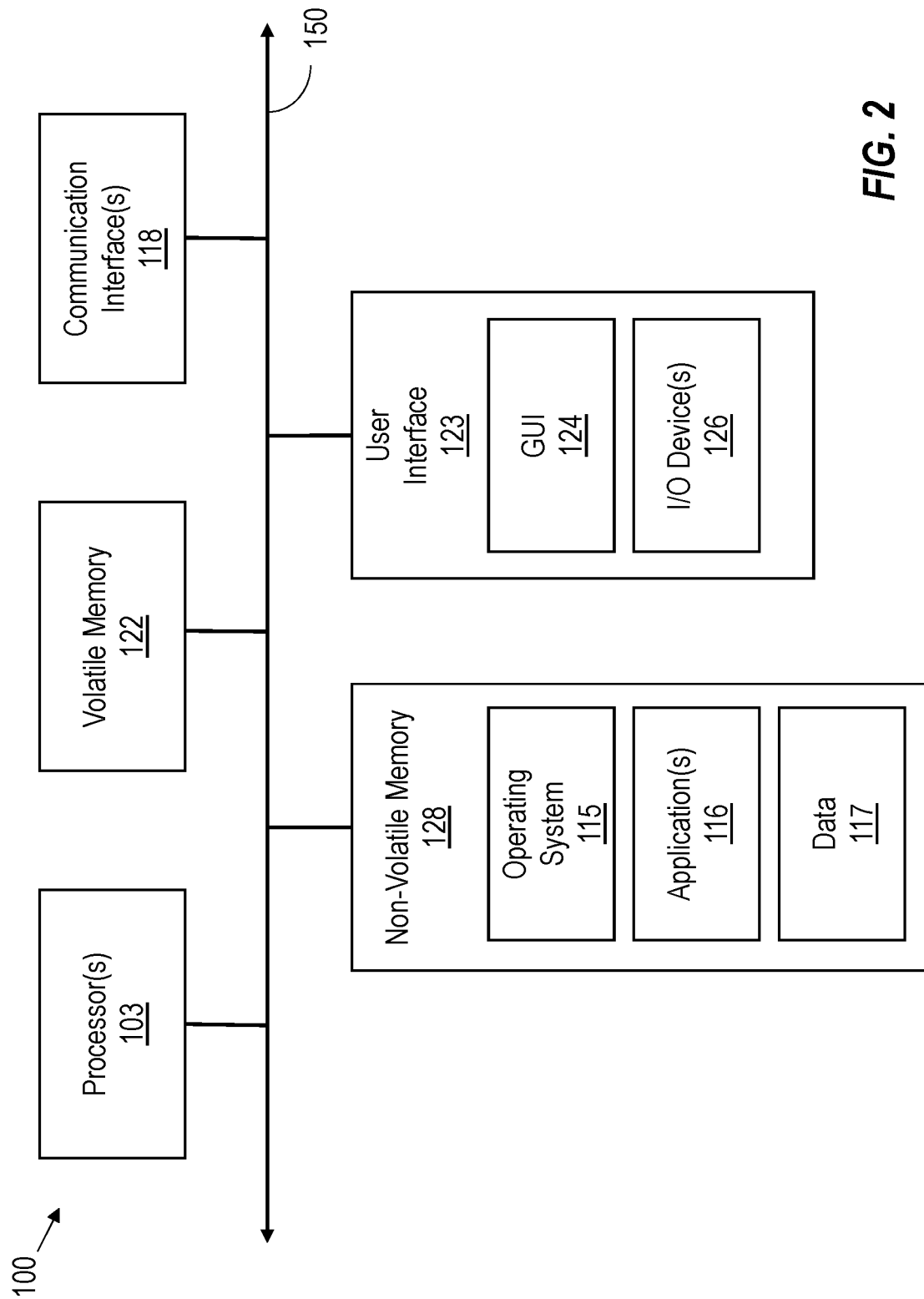
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
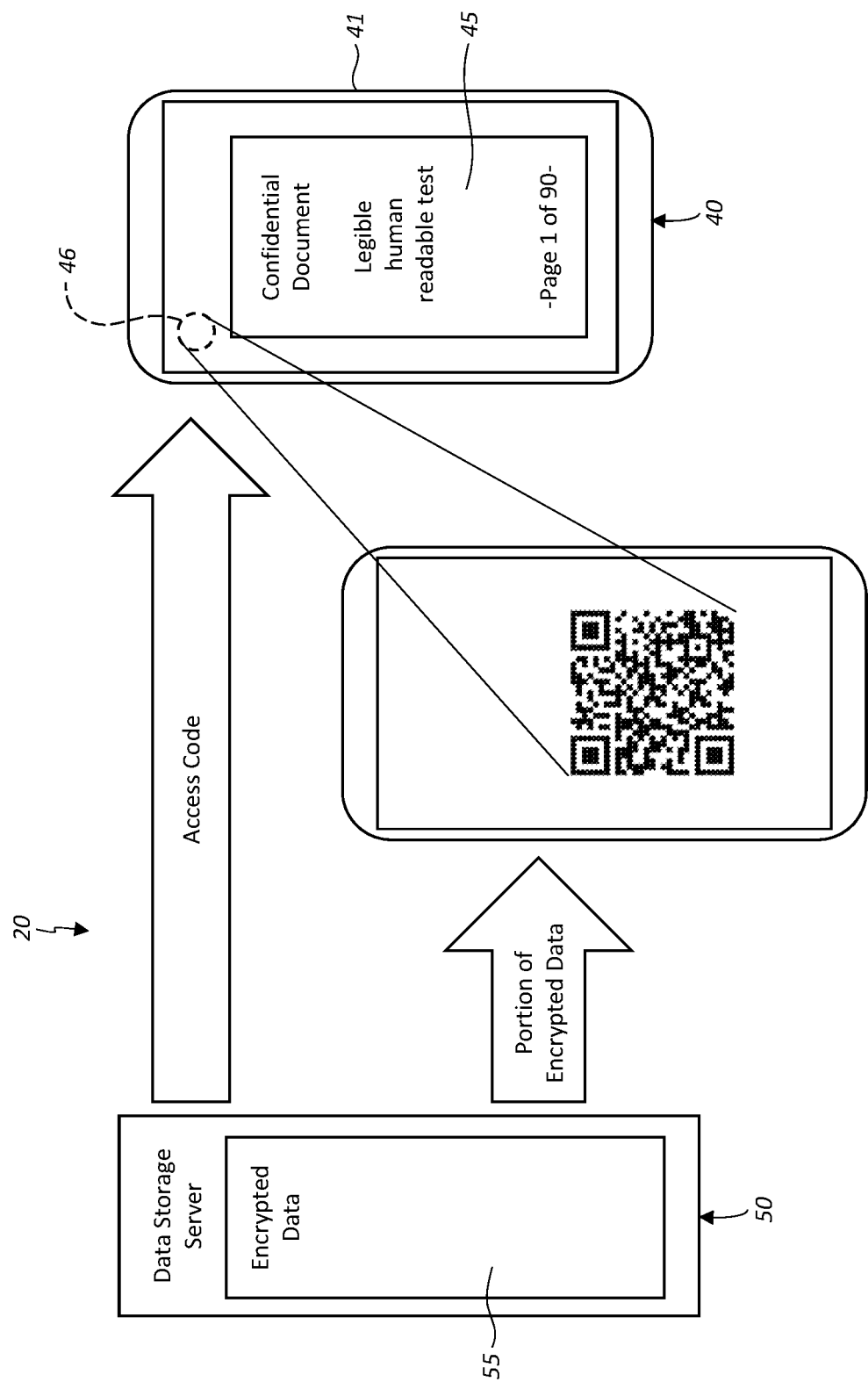
FIG. 3 is a schematic diagram of a system for decrypting encrypted data in accordance with an embodiment.
Figure 4:
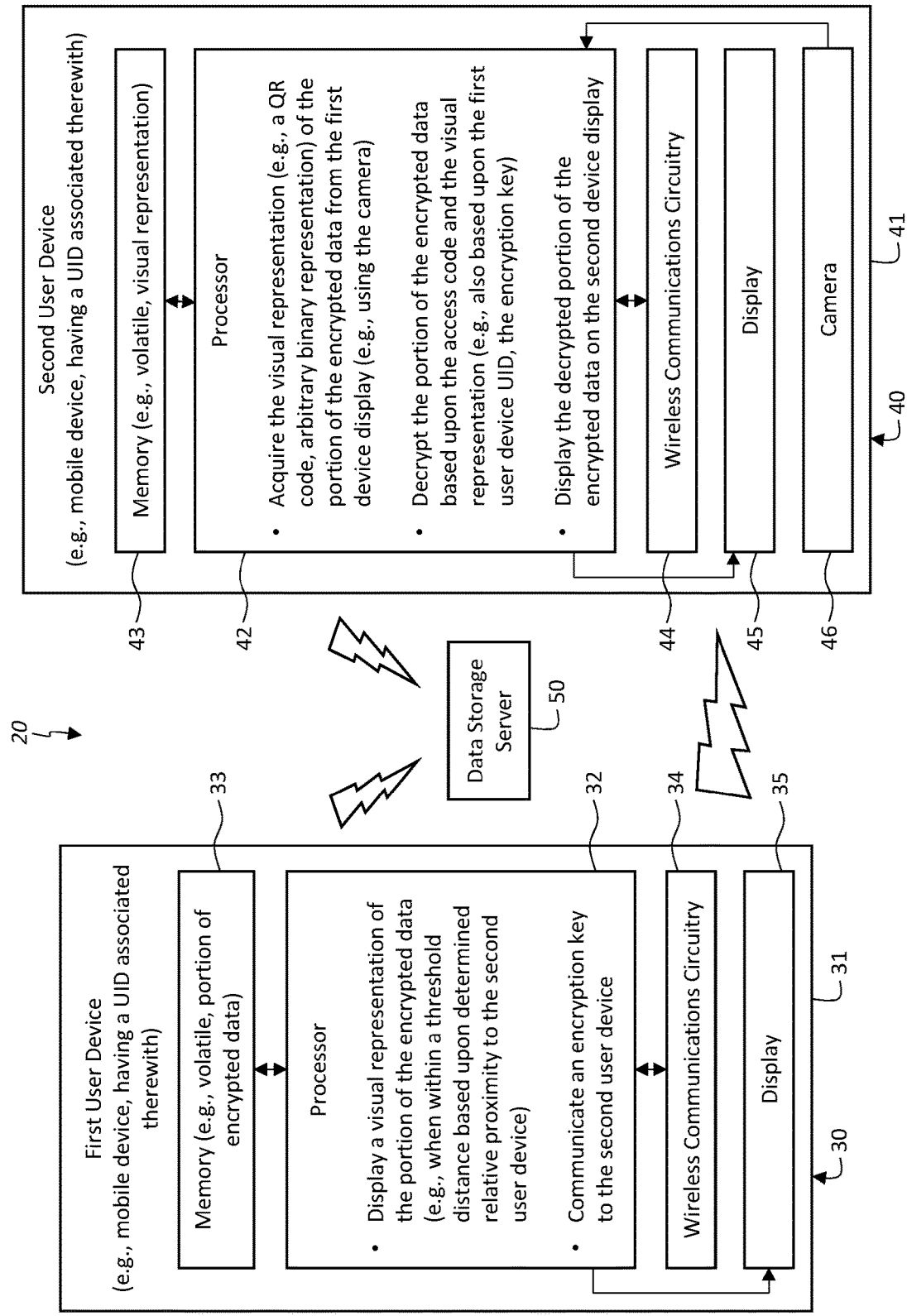
FIG. 4 is another schematic diagram of the system of FIG. 3.
Figure 5:
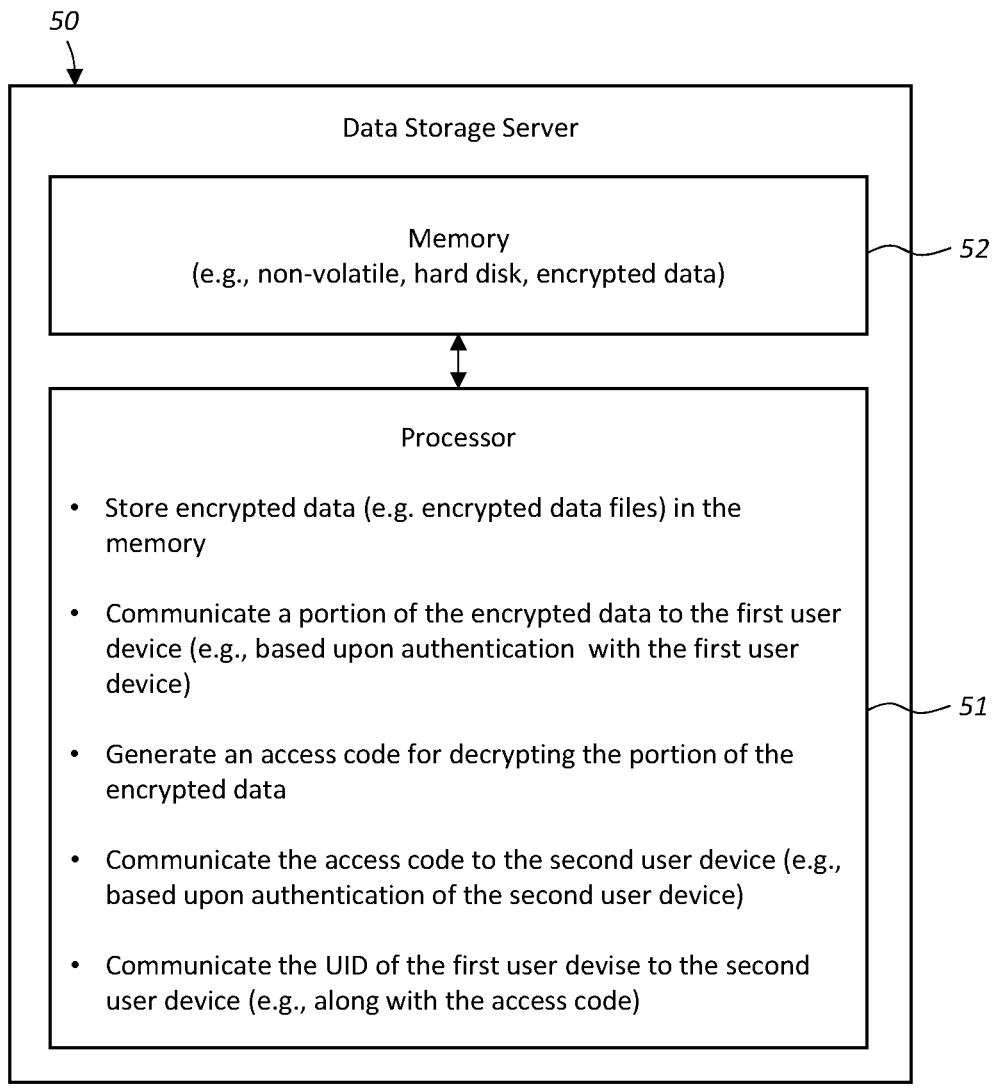
FIG. 5 is more detailed schematic diagram of the data storage server of FIG. 4.

Referring now to FIG. 3, a system 20 for decrypting encrypted data 55 will now be described. The system 20 includes a first user device 30 having a first unique device identifier, for example, global unique identifier (GUID), associated therewith. The first user device 30 is illustratively in the form of a mobile wireless communications device and includes a first device housing 31 a first device processor 32 and a first device memory 33 coupled to the first device processor. The first device memory 33 may be volatile or temporary memory, for example, as opposed to non-volatile memory or magnetic disk memory. Wireless communications circuitry 34 is also coupled to the first device processor 32. The wireless communications circuitry 34 may communicate using cellular, WiFi, near field communications (NFC), Bluetooth, or other wireless communications or radio frequency (RF) communication protocols. A first device display 35 is also coupled to the first device processor 32. The first user device 30 may be another type of device, for example, a wired device, tablet, personal computer (PC), etc.

The system 20 also includes a second user device 40 having a second unique device identifier, for example, global unique identifier (GUID), associated therewith. The second user device 40 is illustratively in the form of a mobile wireless communications device and includes a second device housing 41 a second device processor 42 and a second device memory 43 coupled to the first device processor. The second device memory 43 may be volatile or temporary memory, for example, as opposed to non-volatile memory or magnetic disk memory. Wireless communications circuitry 44 is also coupled to the second device processor 42. The wireless communications circuitry 44 may communicate using cellular, WiFi, near field communications (NFC), Bluetooth, or other wireless communications or radio frequency (RF) communication protocols. The second user device 40 also includes a second device display 45 coupled to the second device processor 42. The second user device 40 also includes an image acquisition device, for example, in the form of a camera 46 coupled to the second device processor 42. The second user device 40 may be another type of device, for example, a wired device, tablet, personal computer (PC), etc.

The system 20 also includes a data storage server 50 coupled to the first and second user devices 30, 40. The data storage server 50 includes a server processor 51 and a server memory 52 cooperating with the server processor. The server memory 52 may non-volatile memory, for example, and/or a magnetic disk or hard disk drive. Encrypted data 55 is stored in the server memory 52, for example, encrypted using a relatively strong encryption algorithm (e.g., advanced encryption standard (AES), triple data encryption algorithm (3DES)). The encrypted data 55 may be stored in one or more other mediums, as will be appreciated by those skilled in the art. The encrypted data 55 may include encrypted data files, for example, documents, text files, image data, etc.

Figure 6:
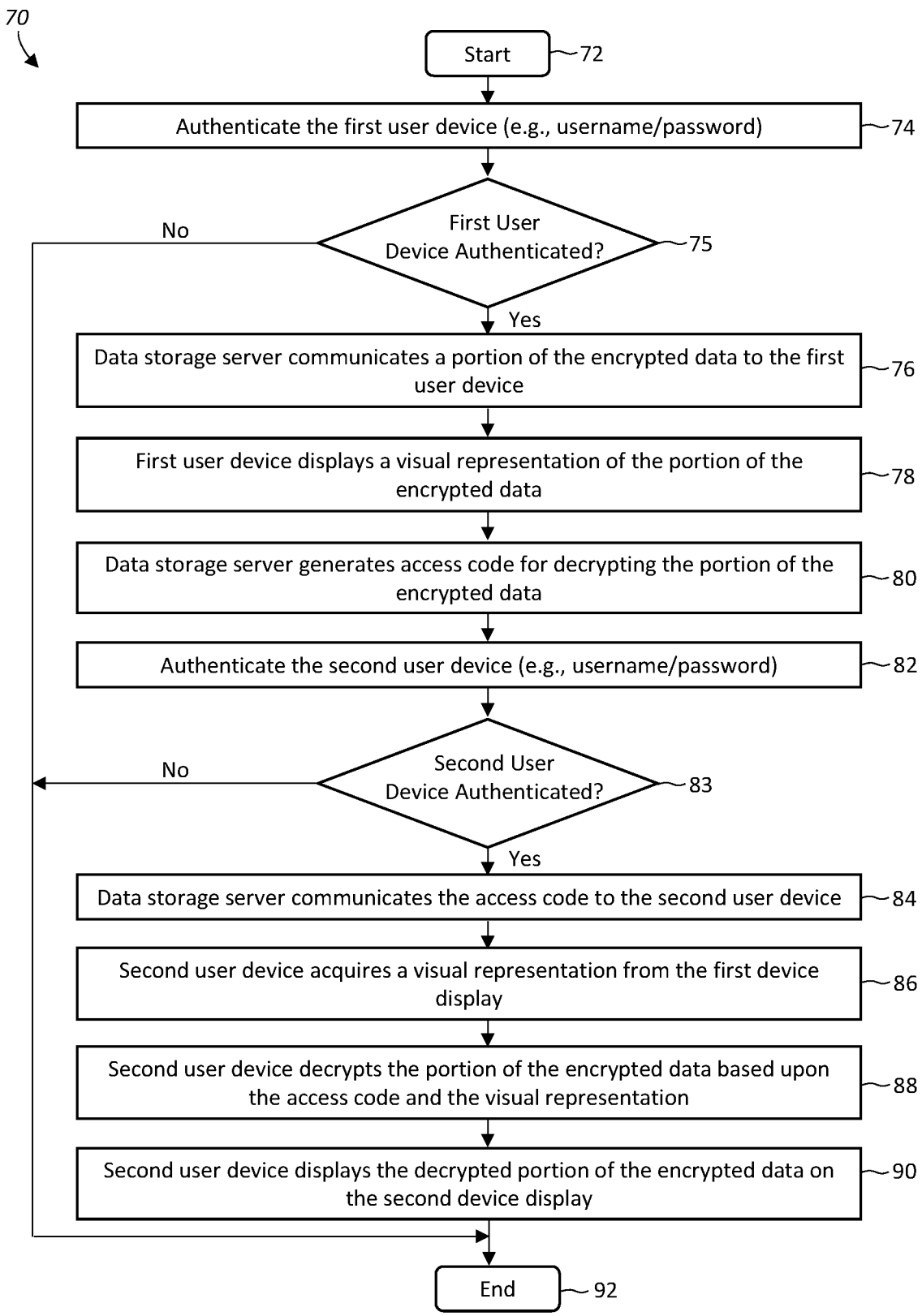
FIG. 6 is a flow diagram illustrating operation of the system for decrypting encrypted data in accordance with an embodiment.

Referring now to the flowchart 70 in FIG. 6, beginning at Block 72, operation of the system 20 will now be described. At Block 74, the data storage server 50 and the first user device 30 may cooperate to authenticate the first user device. More particularly, the first user device 30 may communicate a username and password associated with a first user to the data storage server 50. Of course, other authentication techniques may be used. In some embodiments, the first user device 30 may not be authenticated. Additionally, it should be understood that while functions of the data storage server 50 and first and second user devices 30, 40 are described herein, the operations performed thereby are performed through cooperation of their respective memories 52, 33, 43 and processors 51, 32, 42.

Upon successful authentication of the first user device 30 at Block 75, the data storage server 50 communicates (e.g., wirelessly), by way of the server processor 51 and wireless communications circuitry 34, a portion of the encrypted data 55 to the first user device 30 (Block 76). More particularly, when the encrypted data 55 is in the form of encrypted documents, the data storage server 50 may communicate a single encrypted page, for example, in the form of an encrypted image generated from the raw encrypted data portion (e.g., jpg, gif, png, etc.), of a given document to the first user device 30. The data storage server processor 51 includes logic to render an image of a page of or portion of the encrypted data 55. If authentication is unsuccessful, the operations end at Block 92.

Upon receipt of the portion of the encrypted data 55 (e.g., in encrypted image form) from the data storage server 50, the first user device 30 displays on the first device display 35 a visual representation of the portion of the encrypted data (e.g., a visual representation of the encrypted image representing the portion of the encrypted data) (Block 78). For example, where the encrypted data 55 includes documents, the first user device 30 displays a visual representation of the encrypted first page. The visual representation of the portion of the encrypted data 55 may include a quick response (QR) code, colored pixels, or an arbitrary binary representation. The visual representation may include other and/or additional types of visual representations, as will be appreciated by those skilled in the art. For example, the visual representation may be a cycled series of "screens" of the same encrypted data. Thus, single photographs of the first device display 35 may be insufficient for decryption, as will be described in further detail below.

In some embodiments, the visual representation may not be displayed on the first device display 35 unless the first user device 30 is within a threshold geographic distance from the second user device 40. In other words, the first user device 30 may determine the relative proximity of the second user device 40 and thus, whether the second user device is close enough to the first user device, for example, for added security, and if so, then display the visual representation. In some embodiments, the second user device 40 may determine and communicate the proximity to the first user device 30 and/or perform or restrict operations based upon the determined proximity.

At Block 80, the data storage server 50 generates an access code for decrypting the portion of the encrypted data 55. The access code may be a one-time password, a personal identification number (PIN), or an age-based expiration access code. The access code may be randomly generated. The access code may be another type of access code.

At Block 82, the data storage server 50 and the second user device 40 cooperate to authenticate the second user device. More particularly, the second user device 40 may communicate a username and password associated with a second user to the data storage server 50. Of course, other authentication techniques may be used. In some embodiments, the second user device 40 may not be authenticated. If authentication is unsuccessful, at Block 83, the operations end at Block 92. It should be appreciated by those skilled in the art that the access code may be generated either before or after authentication.

Upon successful authentication of the second user device 40 at Block 83, the data storage server 50 communicates (e.g., wirelessly), by way of the server processor 51 and wireless communications circuitry 44, the access code to the second user device 40 (Block 84). In some embodiments, the data storage server 50 may also communicate, for example, wirelessly, the first UID of the first user device 30 to the second user device 40.

The second user device 40, at Block 86, acquires the visual representation of the portion of the encrypted data 55 from the first device display 35. More particularly, the camera 46 may be used to acquire the visual representation (e.g., take a photo). In some embodiments, the visual representation or its associated data may alternatively or additionally be acquired using respective wireless communications circuitry 34, 44 (e.g., RFID, NFC), or some other technique (e.g., infrared) and/or based upon a broadcast from the first user device 30. Using RFID, for example, may be less susceptible to visual eavesdropping, for example.

The second user device 40 decrypts the portion of the encrypted data 55 (e.g., a first page of an encrypted document) based upon the access code and the visual representation, and when communicated to the second user device, the first UID (Block 88). More particularly, the data storage server 50 associates the access code with the portion of the encrypted data 55 and the first UID so that the second user device 40 can be used for decryption (e.g., based upon a UID match and/or the encrypted visual representation). In some embodiments, the first user device 30, via the first device processor 32 and the wireless communications circuitry 34, may optionally communicate an encryption key to the second user device 40. The second user device 40 may decrypt the portion of the encrypted data 55 also based upon the encryption key. The encryption key may provide further increased security, as will be appreciated by those skilled in the art. If any portion of the decryption fails, for example, the first UID does not match the associated UID, the communicated encryption key is wrong, and/or the access code is wrong, the portion of the encrypted data 55 will not be decrypted.

If, however, the access code, keys, and UID match and the portion of the encrypted data 55 is decrypted, the second user device 40 displays the decrypted portion of the encrypted data on the second device display 45 (Block 90). The second device display 45 displays, for example, where the portion of the encrypted (now decrypted) is a page of a document, that page in legible and human readable format. The operations end at Block 92.

The operations described above are repeated for additional portions (e.g., for each page of the document and only as the user actively views each of the pages of the document on the second user device 40) of the encrypted data 55. Moreover, while operations have been described in a particular order, it will be appreciated that the operations may be performed in another order and/or concurrently, where applicable. Still further, it should be noted that data considered relatively important, such as the encrypted data 55, is not stored in a permanent memory on either the first or second user devices 30, 40. By storing the encrypted data 55 and/or associated data on temporary storage on the first and/or second user devices 30, 40, the system 20 described herein provides relatively significant advantages over a typical security system where a PIN is used to encrypt data on a device.

In some embodiments, there may be more than two user devices, for example, in a chain, to increase security. However, using more than two user devices in a chain may reduce usability and may be undesirable relative to the increase in security.

Moreover, in some embodiments, the system 20 may be integrated using application virtualization software that may permit applications to be accessed by individual devices from a shared server or cloud system. However, such a system may be limited by showing screen-by-screen (not real time animations). Accordingly, the system 20, and more particularly, the first user device 30 may simulate an animated stream of frames (assuming that access codes may be communicated to the second user device 40 in a relatively a timely manner).

With respect to an exemplary implementation, a software development kit (SDK) may provide the "go-between" or "decryptor" functionality. Third party developers may add these things to their own applications, for example, adding their own security checks (e.g., developer specific authentication).

As will be appreciated by those skilled in the art, in the event one of the user devices 30, 40 is lost or stolen, encrypted data 55 would not be compromised to be able to decrypt the encrypted data, for example, read a page of an encrypted document. To compromise the encrypted data 55, both the first and second user devices 30, 40 would have to be stolen and in the possession of the same person. Accordingly, if the first and second devices 30, 40 are managed properly, for example, stored in different places at night, the chances of a data compromise would greatly be reduced.

Figure 7:
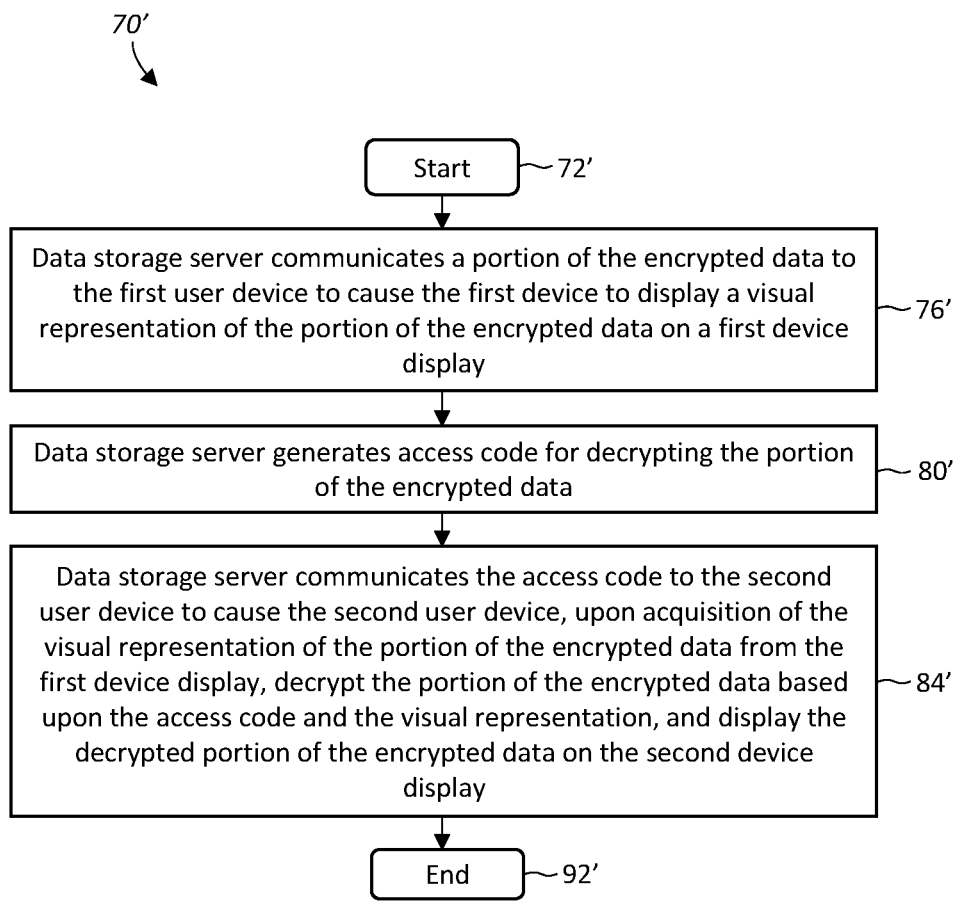
FIG. 7 is a flow diagram illustrating operation of the system for decrypting encrypted data in accordance with another embodiment.

Referring now to the flowchart 70' in FIG. 7, in another embodiment, beginning at Block 72', a method of decrypting encrypted data 55' in a system 20' that includes a first user device 30', a second user device 40', and a data storage server 50' coupled to the first and second user devices and configured to store encrypted data in a server memory is now described. The method includes using the data storage server 50' to communicate a portion of the encrypted data 55' to the first user device 30' to cause the first device to display on the first device display 35' thereof a visual representation of the portion of the encrypted data 55'(Block 76'). At Block 80', the data storage server 50' is used to generate an access code for decrypting the portion of the encrypted data 55', and communicate the access code to the second user device 40' to cause the second user device, upon acquisition of the visual representation of the portion of the encrypted data from the first display 35', decrypt the portion of the encrypted data based upon the access code and the visual representation, and display the decrypted portion of the encrypted data on the second device display 45' (Block 84'). The method ends at Block 92'.

A computer readable medium aspect is directed to a non-transitory computer readable medium for decrypting encrypted data 55 in a system 20 that includes a first user device 30, a second user device 40, and a data storage server 50 coupled to the first and second user devices and configured to store encrypted data in a server memory 52. The non-transitory computer readable medium includes computer executable instructions for causing a processor 51 of the data storage server 50 to perform operations. The operations may include communicating a portion of the encrypted data 55 to the first user device to cause the first user device to display on a first device display 35 a visual representation of the portion of the encrypted data and generating an access code for decrypting the portion of the encrypted data. The operations may also include communicating the access code to the second user device 40 to cause the second user device, upon acquisition of the visual representation of the portion of the encrypted data 55 from the first device display 35, decrypt the portion of the encrypted data based upon the access code and the visual representation, and display the decrypted portion of the encrypted data on a second device display 45.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for decrypting encrypted data comprising:
a first user device;
a second user device; and
a data storage server coupled to the first and second user devices and comprising a server processor and server memory cooperating therewith to
store encrypted data in the server memory,
communicate a portion of the encrypted data to the first user device,
generate an access code for decrypting the portion of the encrypted data, and
communicate the access code to the second user device;
the first user device comprising a first device processor and a first device display coupled thereto, the first device processor being configured to display on the first device display a visual representation of the portion of the encrypted data;
the second user device comprising a second device processor and second device display coupled to the second device processor, the second device processor configured to
acquire the visual representation of the portion of the encrypted data from the first device display,
obtain the portion of the encrypted data,
decrypt the portion of the encrypted data based upon the access code and the visual representation, and
display the decrypted portion of the encrypted data on the second device display.

2. The system of claim 1 wherein the second user device further comprises a camera cooperating with the second device processor to acquire the visual representation of the portion of the encrypted data from the first device display.

3. The system of claim 1 wherein the first user device has a unique device identifier associated therewith; and wherein the second device processor is configured to decrypt the portion of the encrypted data based upon the unique device identifier.

4. The system of claim 3 wherein the data storage server is configured to communicate the unique device identifier to the second user device.

5. The system of claim 1 wherein the first device processor is configured to communicate an encryption key to the second user device; and wherein the second device processor is configured to decrypt the portion of the encrypted data based upon the encryption key.

6. The system of claim 1 wherein the first device processor is configured to determine a relative proximity of the first user device to the second user device, and when within a threshold distance, display on the first device display the visual representation of the portion of the encrypted data.

7. The system of claim 1 wherein the first user device comprises a volatile memory coupled to the first device processor for storing the portion of the encrypted data; and wherein the second user device comprises a volatile memory coupled to the second device processor for storing the visual representation of the portion of the encrypted data.

8. The system of claim 1 wherein the encrypted data comprises a plurality of encrypted data files; and wherein the data storage server is configured to communicate a portion of a given one of the plurality of encrypted data files to the first user device.

9. The system of claim 1 wherein the visual representation comprises one of a quick response (QR) code and an arbitrary binary representation.

10. The system of claim 1 wherein the server processor is configured to communicate the portion of the encrypted data to the first user device based upon an authentication with the first user device.

11. The system of claim 1 wherein the server processor is configured to communicate the access code to the second user device based upon an authentication with the second user device.

12. A method of decrypting encrypted data in a system comprising a first user device, a second user device, and a data storage server coupled to the first and second user devices and configured to store encrypted data in a server memory, the method comprising:
  using the data storage server to
    communicate a portion of the encrypted data to the first user device to cause the first user device to display on a first device display a visual representation of the portion of the encrypted data,
    generate an access code for decrypting the portion of the encrypted data, and
    communicate the access code to the second user device to cause the second user device to, upon acquisition of the visual representation of the portion of the encrypted data from the first device display, obtain the portion of the encrypted data, decrypt the portion of the encrypted data based upon the access code and the visual representation, and display the decrypted portion of the encrypted data on a second device display.

13. The method of claim 12 wherein the visual representation of the portion of the encrypted data is acquired from the display of the first user device using a camera.

14. The method of claim 12 wherein the first user device has a unique device identifier associated therewith; wherein the second user device decrypts the portion of the encrypted data based upon the unique device identifier; and wherein using the data storage server comprises using the data storage server to communicate the unique device identifier to the second user device.

15. The method of claim 12 wherein the encrypted data comprises a plurality of encrypted data files; and wherein using the data storage server comprises using the data storage server to communicate a portion of a given one of the plurality of encrypted data files to the first user device.

16. The method of claim 12 wherein using the data storage server comprises using the data storage server to communicate the portion of the encrypted data to the first user device based upon an authentication with the first user device.

17. The method of claim 12 wherein using the data storage server comprises using the data storage server to communicate the access code to the second user device based upon an authentication with the second user device.

18. A non-transitory computer readable medium for decrypting encrypted data in a system comprising a first user device, a second user device, and a data storage server coupled to the first and second user devices and configured to store encrypted data in a server memory, the non-transitory computer readable medium comprising computer executable instructions for causing a processor of the data storage server to perform operations comprising:
  communicating a portion of the encrypted data to the first user device to cause the first user device to display on a first device display a visual representation of the portion of the encrypted data;
  generating an access code for decrypting the portion of the encrypted data; and
  communicating the access code to the second user device to cause the second user device to, upon acquisition of the visual representation of the portion of the encrypted data from the first device display of the first user device, obtain the portion of the encrypted data, decrypt the portion of the encrypted data based upon the access code and the visual representation and display the decrypted portion of the encrypted data on a second device display.

19. The non-transitory computer readable medium of claim 18 wherein the first user device has a unique device identifier associated therewith; wherein the second user device decrypts the portion of the encrypted data based upon the unique device identifier; and wherein the operations comprise communicating the unique device identifier to the second user device.

20. The non-transitory computer readable medium of claim 18 wherein the encrypted data comprises a plurality of encrypted data files; and wherein the operations comprise communicating a portion of a given one of the plurality of encrypted data files to the first user device.

* * * * *